United States Patent [19]

Shah et al.

[11] Patent Number: 4,864,529

[45] Date of Patent: Sep. 5, 1989

[54] FAST MULTIPLIER ARCHITECTURE

[75] Inventors: Imran A. Shah, North White Plains; Arup K. Bhattacharya, Peekskill, both of N.Y.

[73] Assignee: North American Philips Corporation, New York, N.Y.

[21] Appl. No.: 916,916

[22] Filed: Oct. 9, 1986

[51] Int. Cl.[4] .............................................. G06F 7/44
[52] U.S. Cl. .................................................. 364/760
[58] Field of Search ....................... 364/754, 757, 760

[56] References Cited

U.S. PATENT DOCUMENTS

| | | | |
|---|---|---|---|
| 3,366,780 | 1/1968 | Rec et al. | 364/760 |
| 3,372,269 | 3/1968 | MacSorley et al. | 364/760 |
| 4,041,292 | 8/1977 | Kindell | 364/760 |
| 4,153,938 | 5/1979 | Ghest et al. | 364/760 |
| 4,546,446 | 10/1985 | Machida | 364/759 |
| 4,575,812 | 3/1986 | Klober et al. | 364/760 |
| 4,638,449 | 1/1987 | Frey | 364/760 |
| 4,646,257 | 2/1987 | Essig et al. | 364/760 |
| 4,706,211 | 11/1987 | Yamazaki | 364/760 |
| 4,718,031 | 1/1988 | Nukiyama | 364/754 |
| 4,718,034 | 1/1988 | Tabla et al. | 364/760 |
| 4,745,570 | 5/1988 | Diedrich et al. | 364/760 |

FOREIGN PATENT DOCUMENTS

| 3545433 | 7/1986 | Fed. Rep. of Germany | 364/757 |
|---|---|---|---|
| 0072739 | 6/1981 | Japan | 364/760 |

OTHER PUBLICATIONS

Singh et al, "High-Speed Binary and Decimal Multiply by Array Assist", *IBM Technical Disclosure Bulletin*, vol. 18, #12, pp. 4105–4106, May 1976.

Waser et al, "Real-Time Processing Gains Ground with Fast Digital Multiplier", *Electronics*, vol. 50, #20, pp. 93–99, 9/29/77.

Jump et al., "Effective Pipelining of Digital Systems", *IEEE Trans. on Computers*, vol. C-27, #9, pp. 855–865, Sep. 1978.

*Primary Examiner*—Gary V. Harkcom
*Assistant Examiner*—Dale M. Shaw
*Attorney, Agent, or Firm*—Thomas A. Briody; Jack E. Haken; Jack D. Slobod

[57] ABSTRACT

A digital multiplier circuit which implements a modified multiplier algorithm in binary form and can be implemented as a very large scale integrated circuit. The modified algorithm replaces the large summation required in a typical shift-and-add digital multiplier with the sum of smaller summation terms, both yielding the same product. The digital word representing one of the multiplicands is partitioned or sliced into groups of two or more bits. All possible values of each bit slice are pre-calculated and stored to derive partial products thereof by the other multiplicand. The summation of such partial products rather than of individual bit products reduces the number of partial adders by half or more, depending on the number of bits in each partition or slice.

9 Claims, 5 Drawing Sheets

FAST MULTIPLIER ARCHITECTURE

CROSS-REFERENCE TO RELATED APPLICATION

This application is related to copending U.S. patent application Ser. No. 890,247, filed July 24, 1986, for A FAST MULTIPLIERLESS ARCHITECTURE FOR GENERAL PURPOSE VLSI FIR DIGITAL FILTERS WITH MINIMIZED HARDWARE, by the same inventors.

BACKGROUND OF THE INVENTION

1. Field of the Invention

This invention pertains to the architecture of digital multipliers for use in high speed digital signal processing systems, and in particular to such an architecture which is optimized for implementation in very large scale integrated circuits.

2. Description of the Prior Art

Multipliers are very important building blocks of many digital systems. They are extensively used in array processors, video processors, radar signal processors, FFT processors, general digital signal processors, microcomputer/minicomputer accelerators and many other similar applications.

In the majority of applications, it is the throughput speed not the total latency in time that is the important measure of the multiplication speed. In other words, for most applications pipelined multipliers seem very attractive because of their high throughput. The conventional shift-and-add multiplier algorithm lends itself to pipelining very easily at various levels, but is requires $N-1$ shift-and-adds if there are N bits in the multiplicand. An alternative is using Booth's Algorithm for multiplication. This is an efficient implementation, but is difficult to pipeline and hence has a lower throughput rate than the shift-and-add algorithm.

The present application discloses a modification of the shift-and-add algorithm which achieves the same throughput rate as the original algorithm while requiring only half the number of (or even less) shift-and-add operations. Also, in many applications it is desired to use the multiplier as an unsigned magnitude multiplier to achieve an extra bit of precision, rather than a two's compliment signed multiplier. This application discloses a provision in its architecture such that the multiplier can perform both two's compliment and unsigned magnitude as well as mixed mode multiplication.

SUMMARY OF THE INVENTION

This invention presents a novel modified multiplier algorithm in its binary representation and an architecture for implementing the modified algorithm in a very large scale integrated circuit. The modified algorithm replaces a larger summation in a typical shift-and-add digital multiplier with a sum of smaller summation terms, both yielding the same product. It does this by utilizing a partitioning or partial slicing of the digital word representing one multiplicand into groups of two or more bits. When implemented in an architecture, this bit-slicing permits the use of partial multipliers and the pre-calculation and storing of partial product results. The summation of partial products reduces the number of partial planes and adders by half or more, depending on the size of the partition or partial slice.

The partial multiplier utilizes the fact that an even multiple of a digital multiplicand is merely a shift. It also uses precalculated and stored odd multiples of the same multiplicand. The partial multiplier then uses an n to $2^n$ decoder and a multiplexer to select a partial product. All partial products of one multiplicand are processed in parallel simultaneously, using one set of registers for each prestored odd multiple of the full multiplicand. Partial products selected by the multiplexer are then fed to a minimized pipeline adder tree for summation, after appropriate shift, to obtain the final product. The pipeline adder tree uses about one-half the adders used in a conventional shift and add multiplier.

DESCRIPTION OF THE PREFERRED EMBODIMENTS

The present invention relates to a novel modified multiplication algorithm based on the traditional shift-and-add algorithm, and its implementation in a fast digital multiplier fabricated in VLSI. The algorithm lends itself to pipelining and hence is capable of very high throughput rates, while reducing the shift-and-add operations by half or more. To understand the algorithm, its derivation is presented.

The multiplier operation can be expressed as follows $$Y_n = C_n X_n \tag{1}$$

where $Y_n, X_n$ and $C_n$ are the $n^{th}$ result, and multiplicand values where $Y_n, X_n$ and $C_n$ are the $n^{th}$ result, and multiplicand values respectively.

Assume that multiplicand $X_n$ is represented by M bits and multiplier $C_n$ by L bits. Then, $X_n$ can be written in terms of binary representation as:

$$X_n = \sum_{k=0}^{M-1} x_{n,k} 2^k, \text{ for all } n \tag{2}$$

where $x_{n,k}$ is the $k^{th}$ significant bit of $X_n$. Similarly the $C_n$ are represented by $$C_n = \sum_{j=0}^{L-1} c_{n,j} 2^j, \text{ for all } n \tag{3}$$

For multiplicands less than unity, the sum is multiplied by $2^{31\,L}$ corresponding to a shift in binary point. Substituting Equations (2) and (3) in Equation (1) we get:

$$Y_n = \sum_{j=0}^{L-1} c_{n,j} 2^j \sum_{k=0}^{M-1} x_{n,k} 2^k \tag{4}$$

We now expand the term of Equation (4) to see to see what it represents more clearly.

$$Y_n = c_{n,0} 2^0 \sum_{k=0}^{M-1} x_{n,k} 2^k + c_{n,1} 2^1 \sum_{k=0}^{M-1} x_{n,k} 2^k + \ldots + \quad (5)$$

$$c_{n,L-1} 2^{L-1} \sum_{k=0}^{M-1} x_{n,k} 2^k$$

Figure 1:
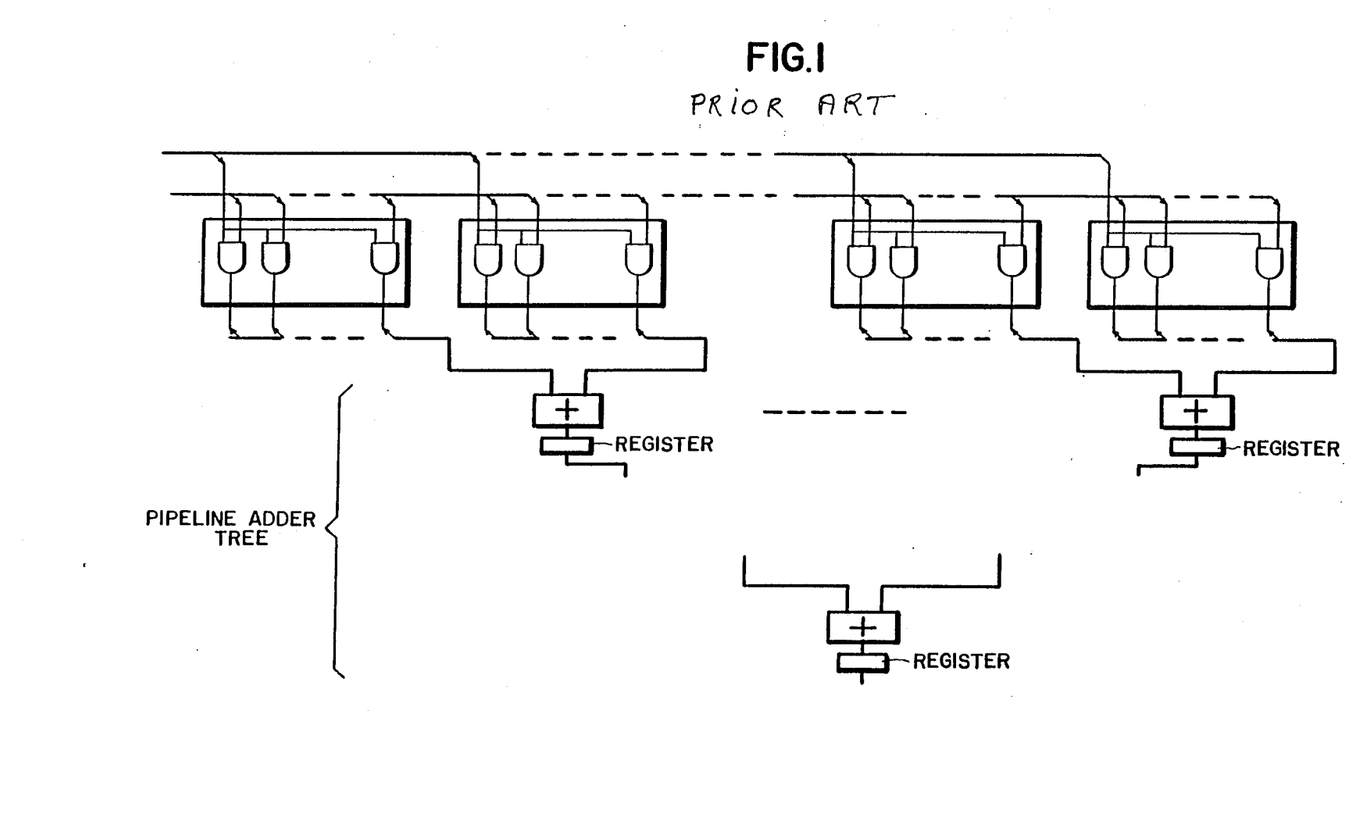
FIG. 1 is a schematic block diagram implementing a conventional shift-and-add algorithm.

From the above equation it is clear that we have derived the conventional shift-and-add algorithm for multiplication, the hardware implementation of which requires L-1 shift-and-adds for the L bits in the multiplicand C. This is illustrated in FIG. 1.

To reduce hardware complexity without compromising speed we will modify this algorithm.

MODIFIED ALGORITHM WITH MERGED BITS

Equation (4) above can be expressed, without loss of generality, as:

$$Y_n = \sum_{j=0}^{a} c_{n,j} \left( \sum_{k=0}^{M-1} x_{n,k} 2^k \right) 2^j + \quad (6)$$

$$\sum_{j=a+1}^{b} c_{n,j} \left( \sum_{k=0}^{M-1} x_{n,k} 2^k \right) 2^j + \ldots +$$

$$\sum_{j=d+1}^{L-1} c_{n,j} \left( \sum_{k=0}^{M-1} x_{n,k} 2^k \right) 2^j$$

ps where a, b, c, ..., d are integers such that $$0 \leq a \leq b \leq c \leq \ldots \leq L-1.$$

We have just expressed the large summation term of Equation 5 as a sum of a number of smaller summation terms, both yielding the same $Y_n$. To show the effect it will have on the hardware implementation, we will present a typical example.

Assume a multiplier where one of the multiplicands $X_n$ is expressed as an M bit binary word and the other multiplicand $C_n$ as an eight bit binary word. Then Equation (5) becomes:

$$Y_n = c_{n,0} 2^0 \sum_{k=0}^{M-1} x_{n,k} 2^k + c_{n,1} 2^1 \sum_{k=0}^{M-1} x_{n,k} 2^k + \ldots + \quad (5a)$$

$$c_{n,7} 2^7 \sum_{k=0}^{M-1} x_{n,k} 2^k$$

where each of the eight intermediate partial products is calculated by an AND operation of one bit of C with the entire M bits of X, then shifting them appropriately and adding them to the other terms in the same equation. This means that to implement Equation (5a) we would need seven shift-and-add operations.

Now expressing Equation (5a) in the form of Equation (6) we get:

$$Y_n = \sum_{j=0}^{1} c_{n,j} \left( \sum_{k=0}^{M-1} x_{n,k} 2^k \right) 2^j + \quad (7)$$

$$\sum_{j=2}^{3} c_{n,j} \left( \sum_{k=0}^{M-1} x_{n,k} 2^k \right) 2^j + \sum_{j=4}^{5} c_{n,j} \left( \sum_{k=0}^{M-1} x_{n,k} 2^k \right) 2^j +$$

-continued $$\sum_{j=6}^{7} c_{n,j} \left( \sum_{k=0}^{M-1} x_{n,k} 2^k \right) 2^j$$

where a, b, c and d of Equation (6) are 1, 3, 5 and 7 respectively. Comparing Equations (5a) and (7) we see that the addition terms have been reduced by half (from 8 to 4), but the operation going on between the additions is not an AND operation any more, but something more complex. To get further insight into this operation let us examine one of the four summation terms in detail. From Equation (7) we have:

$$Y_{n,0:1} = \sum_{j=0}^{1} c_j \left( \sum_{k=0}^{M-1} x_{n,k} 2^k \right) 2^j \quad (8)$$

In the equation above two bits of C are being multiplied by M bits of X and this produces the partial product $Y_{n,0:1}$, which is then added to three other similar terms after appropriate shifts to get the final product $Y_n$.

Figure 2:
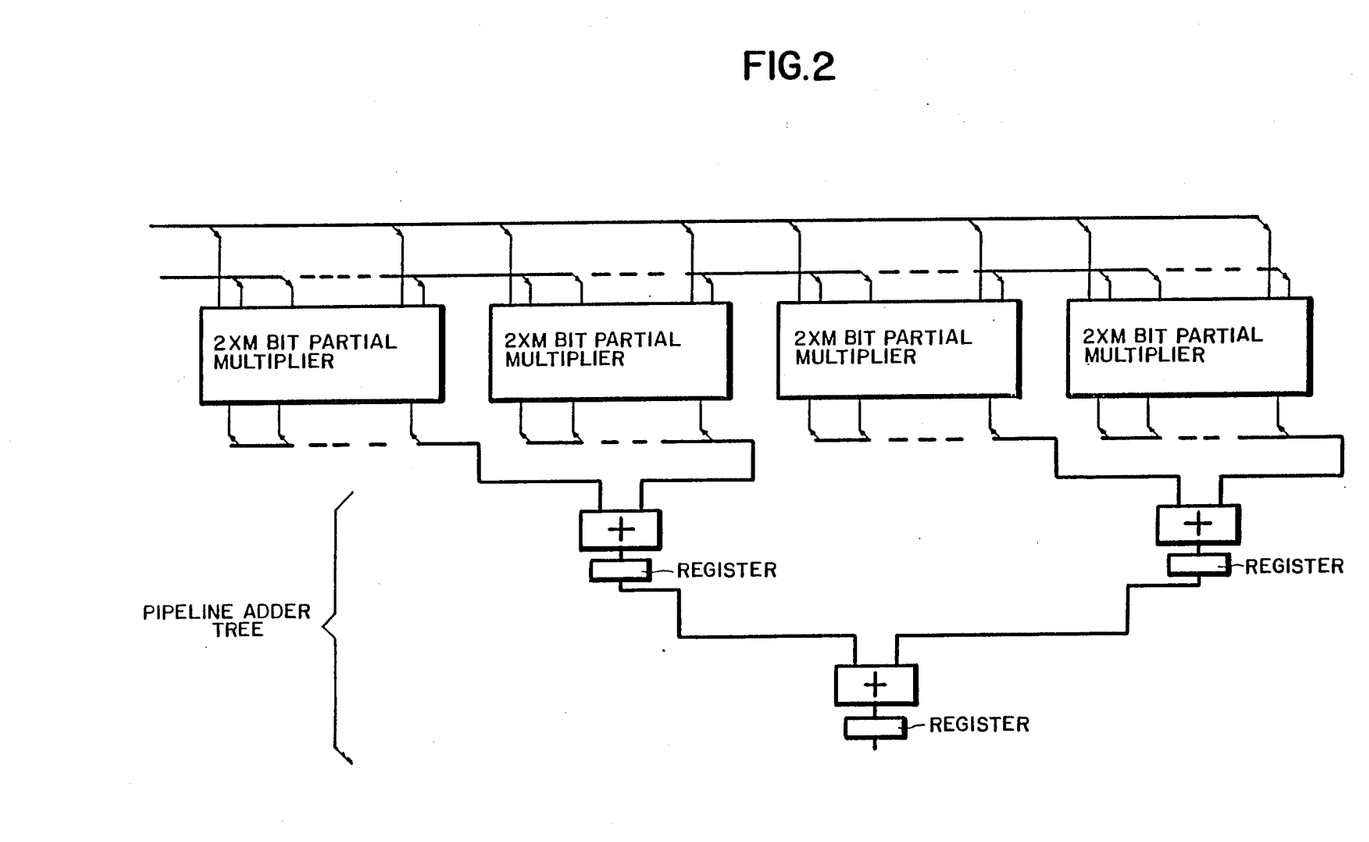
FIG. 2 is a schematic block diagram implementing a modified shift-and-add algorithm with merged bits according to the present invention.

The effect of the manipulation of Equation (7) has been the merger of two adjacent shift-and-add terms of Equation (5a) into one, thereby reducing the number of terms to be added by half, while making the intermediate AND operation into a more complex two-bit by M-bit partial multiplication, as shown in FIG. 2.

The reduction in hardware complexity obtained from the reduction in the number of additions more than offsets the increase caused by the more complex intermediate operations. The two-bit by M-bit partial multiplications can be easily accomplished by a simple partial multiplier circuit to be explained in the following section.

A TWO-BIT BY M-BIT PARTIAL MULTIPLIER

It is easy to see that multiplying X with a two bit number will result in one of the following results:

0, X, 2X, 3X.

Figure 3:
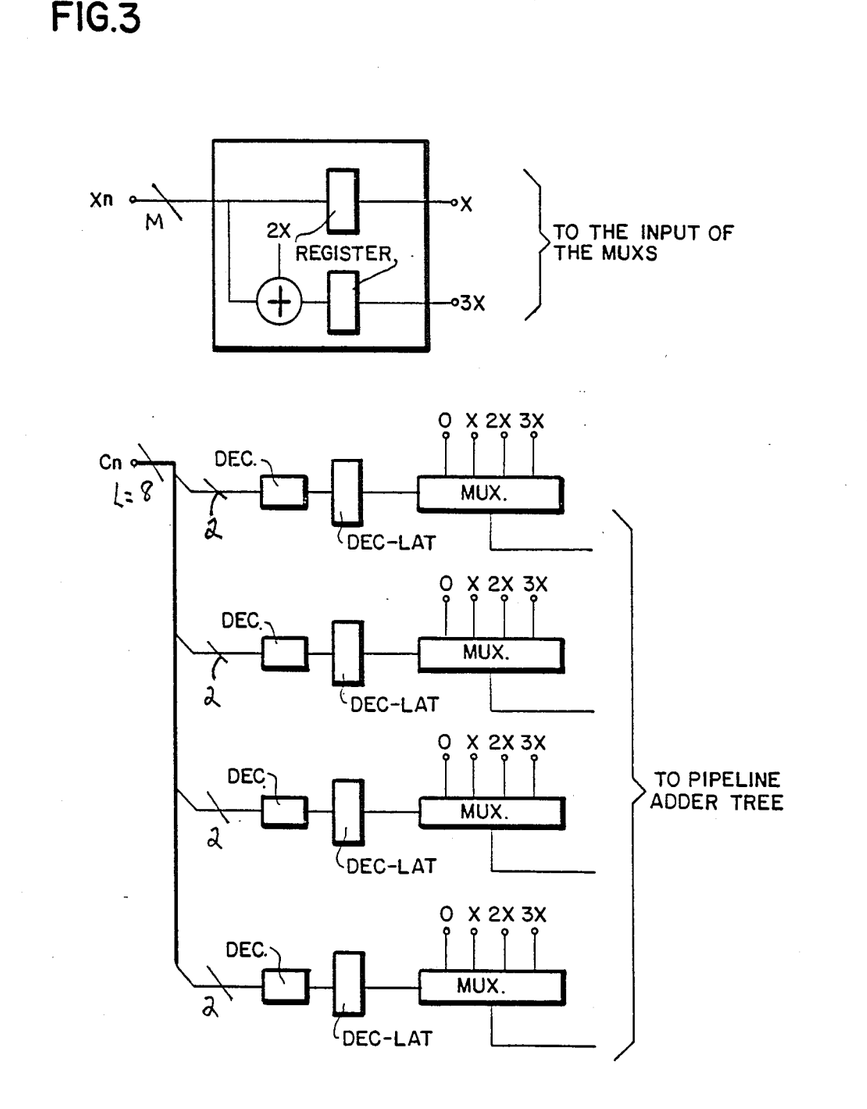
FIG. 3 is a schematic block diagram showing four 2-bit by M bit partial multipliers.

We will demonstrate the working of the partial multiplier by concentrating only on Equation (8) and forgetting for the time being the other three sums of Equation (7). Referring to FIG. 3, the multiplicand C, having eight bits, is partitioned into four slices each having two bits each. M bits of X and two bits of C are presented to the circuit. In the first cycle a circuit calculates 3X and holds the value of both X and calculated 3X in registers. The calculation of 3X is an addition of X to 2X, 2X being a shift of X. At the same time the two bits of C are decoded and the decoded value is stored in a register. In the next cycle, depending on the value of the decoded two bits of C, one of 0, X, 2X or 3X is selected via a multiplexer and is presented to the multiplier output.

Now if we consider the entire Equation (7), it is easily seen that similar operations will take place for the three other terms of Equation (7) (for an eight-bit input word) in parallel. The results from the outputs of these partial multipliers are then appropriates shifted in accordance with their binary weights and added by a simple pipeline adder tree. This adder tree is also reduced in complexity since now it has to add partial results from half the number of terms than that in FIG. 1.

Figure 4:
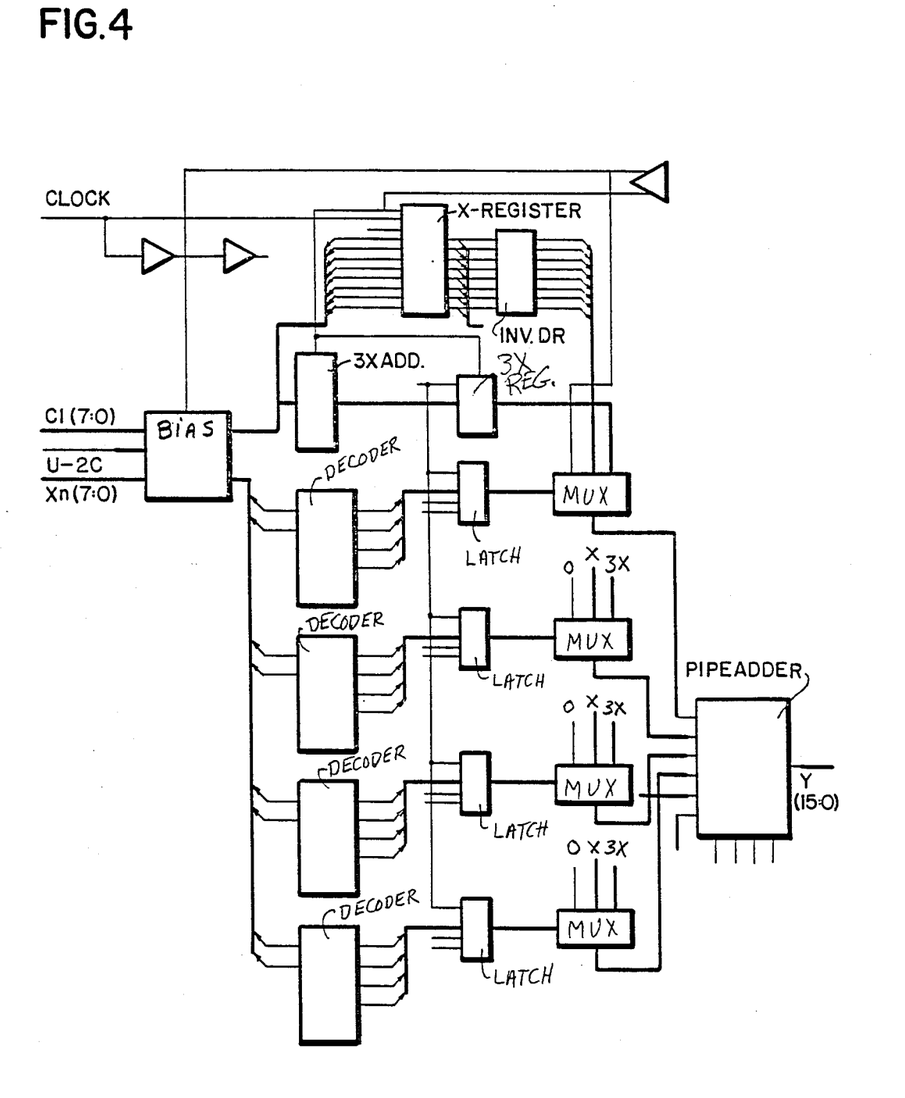
FIG. 4 is a circuit diagram of an $8 \times 8$ bit multiplier according to the present invention, using the four partial multipliers of FIG. 3.

FIG. 4 is a schematic diagram of an 8 bit by 8 bit multiplier using four two-bit partial multipliers, as described above.

THREE-BIT BY M-BIT PARTIAL MULTIPLIER

The number of shift-and-add terms can be further reduced by using three-bit by M-bit partial multipliers rather than the two-bit by M-bit partial multipliers, as described in the previous section.

Figure 5:
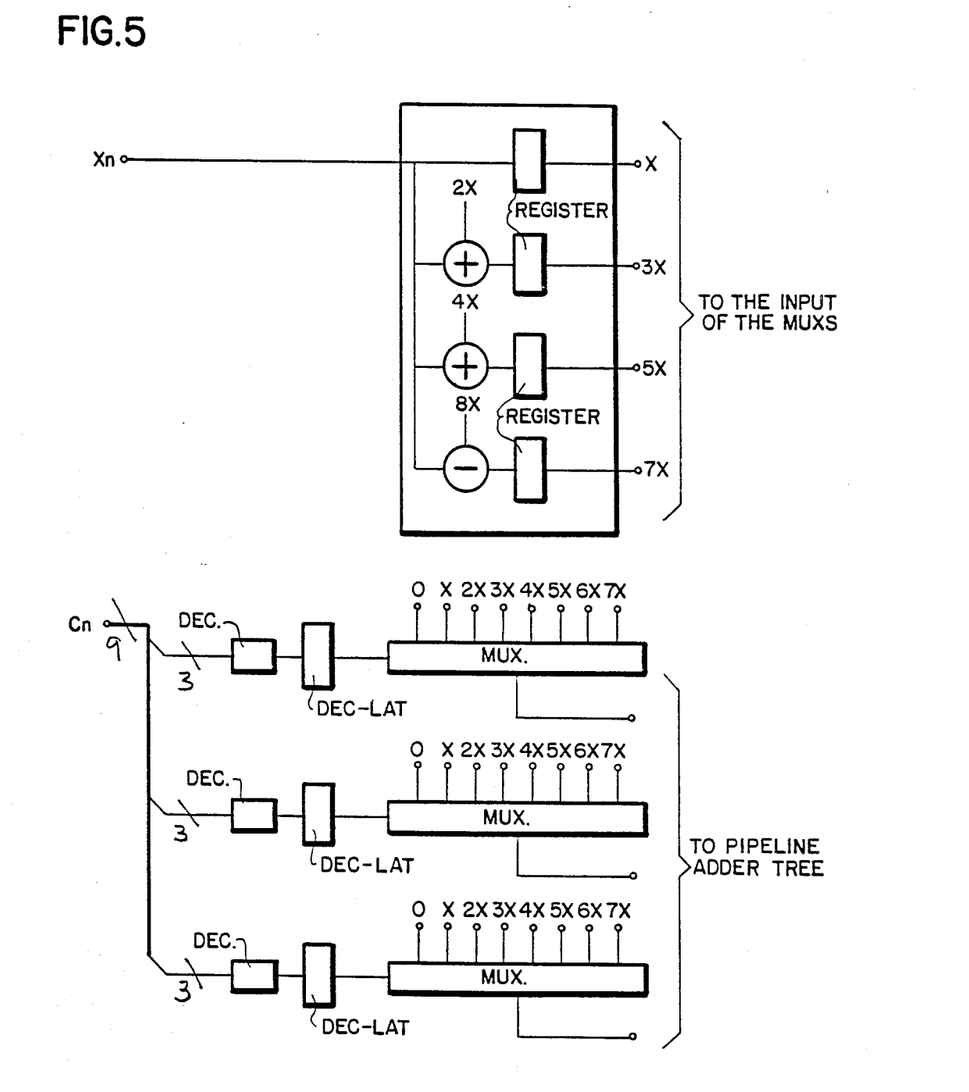
FIG. 5 is a block diagram showing three 3-bit by M bit partial multipliers.

To perform three-bit by M-bit partial multiplication 2X, 3X, 4X, 5X, 6X and 7X must be determined by shift or calculation, as the value of X is presented to the circuit, so that one of them can be selected if appropriate as the result of the partial multiplication. Note that we do not need registers to store 2X, 4X and 6X as they are just shifts of X, 2X and 3X respectively. So in increasing the partial multiplier complexity to three bits by M bits we only need additional registers and adders for 5X and 7X, a shown in FIG. 5. In this embodiment the decoder and multiplexer complexity is increased, and it has to be determined which partition size is optimal for a given application.

We have shown two of the many possible partial multiplier sizes in which the digital circuit can be implemented. In the selection of the partial multiplier size, there is an obvious tradeoff between the partial product calculation and the storage circuitry requirement versus the arithmetic circuitry required. We note that as we move from a two-bit by M-bit partial multiplier (FIG. 3) to a three-bit by M-bit partial multiplier (FIG. 5) we reduce our arithmetic complexity (reducing the number of terms to be added) but increase our partial produce calculation and storage circuitry requirement (requiring registers for 5X and 7X).

As we increase our partial multiplier size, the advantage due to reduction in the number of additions is somewhat offset by the increased additional circuitry until we reach a point that further increase eliminates the advantage of reduced additions. For an 8×8 bit multiplier, a two-bit by M-bit partial multiplier is optimal, and for a 9×9 bit multiplier a three-bit by M-bit partial multiplier is optimal. For other sizes all tradeoffs must be considered carefully before choosing a partial multiplier size. It should be noted that the partitions or bit slices of one multiplicand for a set of partial multipliers do not have to be equal in length.

MODIFIED DESIGN TO ALLOW NEGATIVE NUMBERS

The algorithm as presented so far is valid only for positive values of the multiplicands. It can be easily extended, with a modest increase in circuitry, to operate over all four quadrants of multiplication.

Different ways have been proposed of doing this. But since we want our multiplier to be operational in both 2's compliment signed mode and unsigned mode, we found that the technique of applying bias to both multiplicands so that only positive numbers are involved, to be the most efficient.

In the case in which both M bit multiplicand $X_n$ and L bit multiplicand $C_n$ have sign bits, positive offsets can be added to both of them so that the resultant is always positive.

$$C_n' = C_n + C_o \quad (9)$$

$$X_n' = X_n + X_o \quad (10)$$

where $C_o$ and $X_o$ are positive offsets applied to make $C_n'$ and $X_n'$ always positive.

Substituting $C_n'$ and $X_n'$ in equation (1) we get:

$$Y_n' = C_n' X_n' \quad (11)$$

$$Y_n' = (C_n + C_o)(X_n + X_o) \quad (12)$$

$$Y_n' = C_n X_n + [C_o X_n + X_o C_n + X_o C_o] \quad (13)$$

It is clear that the term in brackets will have to be subtracted from Equation (13) in order to retrieve the expression of Equation (1). The third term in the bracket is just a constant power-of-two term and can be precalculated and stored. The other two terms in the bracket can be calculated by simple shifts of $X_n$ and $C_n$. These terms are then subtracted from the final output of the filter by incorporating a biassing and subtracting circuit in the pipeline adder tree. It should be pointed out that $C_o$ and $X_o$ are just appropriate powers of two scaling corresponding to the most significant bits of the multiplicands' word lengths.

With this simple modification, our multiplier circuit can handle negative numbers, and hence is capable of four quadrant operation. The advantage of using this simple biasing scheme is that for unsigned operation, a switch just removes the biasing and subtracting circuitry from the active circuit and the result is an unsigned multiplier with one bit increases precision in each multiplicand. The bias and subtract block is shown in FIG. 4.

VLSI IMPLEMENTATION

An 8×8 bit multiplier was constructed and simulated to demonstrate the working of our concept. For fast turnaround time Standard Cell implementation was chosen. The prototype was simulated using Signetics' 2 micron, double metal standard cell library on a Mentor workstation. The purpose of implementation was to outline the speed and hardware simplicity of multiplication. FIG. 4 shows the block diagram of the 8×8 bit multiplier. A two-bit by M-bit "partial multiplier" was chosen for simplicity.

Referring to FIG. 4, the 3X ADD is the "partial product" adder which calculates 3X when X is presented to the circuit in the first cycle. At the same time the latches store the decoded value derived by each decoder of the corresponding slices of two bits of C. After the first cycle has been completed the X register and 3X register hold the values of X and 3X respectively. Only one set of these registers is needed for supplying those values to all partial multipliers. In the next cycle, the multiplexers select and make available one of the four precalculated or shifted partial products 0, X, 2X, 3X. These operations are conducted in parallel for all terms of Equation (7) and the outputs of the four multiplexers are added with appropriate shifts by the pipe adder which is a pipeline adder tree. The pipeline adder tree is shown and described in the above crossreferenced copending application Ser. No. 890,247.

The multiplexer was designed with two important objectives in mind:
(i) circuit simplicity and high speed; and
(ii) speed of operation to be independent of coefficient or data word length.

For this purpose tri-state gates were used instead of the usual AND-OR-INVERTERS, which would have made the operational speed word length dependent. The multiplexer is shown and described in the crossreferenced application.

The motive of the construction and simulation of this design is to demonstrate the working of our concept. no provision was made to optimize the speed by using fast adders (for example full carry look ahead adders), etc. We used Signetics' four bit carry look ahead adders cascaded in ripple carry fashion, so the results are by no means the maximum speed attainable by the architecture.

A simulation was carried out both in the signed 2's compliment mode and the unsigned magnitude mode. $X_n$ and $C_n$ were both generated as random numbers and the multiplier was tested working at frequencies around 30 MHz.

By simulating the 8×8 bit multiplier, we have demonstrated the tremendous high speed capability of the architecture. The architecture is technology independent, but the highest attainable speed of filter operation is of course technology dependent. For some not so demanding tasks (<20 MHz.), a standard cell implementation of this architecture may make sense because of its full precision of multiplication and relatively low transistor count. But for very high frequency use (>30 MHz. ) it is suggested that a full custom approach is most suited. Such an approach maximizes the advantages offered by the architecture, and attains the best speed performance. As a rough estimate of the high frequency capabilities of this architecture, consider the implementation in ECL technology. In this technology, typical 12 bit addition speeds are under 8 ns. A single buffer delay is around 1 ns, and the setup and hold times are under 1 ns each. This implies that the multiplier can be theoretically operated at almost 10 ns clock/sample rate, yielding 100 million samples/second (100 MHz.) throughput rate, while having hardware complexity much less than a conventional multiplier architecture. With CMOS speeds approaching that of ECL technology, operation around the same frequencies may easily be obtained even in CMOS technology.

This architecture offers advantage in both speed of operation and hardware complexity reduction, making it attractive for use in high speed multiplication application.

What is claimed:

1. A digital multiplier circuit for determining the product of a first multiplicand having M bits by a second multiplicand having L bits, comprising:
    an input register for receiving in parallel and storing all M bits of said first multiplicand;
    input means for receiving the bits of said second multiplicand partitioned into slices of $w_i$ bits each, where $1<w_i<L$;
    means to calculate and store in a set of further registers all odd multiples (exceeding unity) of said first multiplicand by possible $2^{w_i}$ values of the $w_i$ bit slices of said second multiplicand;
    a plurality of decoders connected to said input means to respectively receive therefrom the respective slices of said second multiplicand, each decoder having an output at which it produces the $2^{w_i}$ value of the received $w_i$ bit slice;
    a set of digital latches for respectively receiving and storing the decoded outputs of the respective decoders;
    a plurality of multiplexers each having as inputs thereto said first multiplicand stored in said first register, the odd multiples of the first multiplicand stored in said set of further registers, and even multiples of said first multiplicand derived by shifting the bits thereof; the total number of inputs to each multiplexer being equal to the number of possible $2^{w_i}$ values of the decoded output of each of said decoders;
    each of said multiplexers being connected to the output of a respective one of said decoders and being controlled thereby to select one the inputs to such multiplexer as an output of such multiplexer, such output being a partial produce of said first multiplicand by the $2^{w_i}$ value of one of said bit slices of said second multiplicand;
    biasing means for enabling said multiplexers to operate over all four quadrants of multiplication of said first and second multiplicands by applying a bias to such multiplicands so that only positive values thereof are provided to said multiplexers; and
    a pipeline adder tree connected to said multiplexers to sum the totality of said partial products produced thereby shifted in accordance with the binary weights thereof, such sum being the product of said first and second multiplicands.

2. A digital multiplier circuit as claimed in claim 1, wherein each decoder, latch and multiplexer combination constitutes a multiplier, the output of the multiplexer being the output of such multiplier, the partial product produced thereat being the product of the M bits of said first multiplicand X and the $2^{w_i}$ value of the $w_i$ bits of one of the bit slices of said second multiplicand C.

3. A digital multiplier circuit for determining the product of a first multiplicand X having M bits by a second multiplicand C having L bits, comprising:
    a plurality of input lines for receiving in parallel all L bits of said second multiplicand C partitioned into a number W of bit slices, each slice having $w_i$ bits, where $1<W<L$ and $1<w_i \leq w_j<L$, and $w_j$ is a preselected integer;
    a plurality W of decoders for respectively receiving from said input lines the respective $w_i$ bit slices of said second multiplicand C, each of said decoders having an output at which it produces the $2^{w_i}$ value of the $w_i$ bit slice received thereby;
    a first register for receiving in parallel and storing therein all M bits of said first multiplicand X simultaneously with reception of the L bits of said second multiplicand C;
    means for calculating and storing in respective further registers all odd multiples (other than unity) of said first multiplicand X by possible $2^{w_i}$ values of the respective $W_i$ bit slices of said second multiplicand C;
    a plurality of digital latches for respectively receiving and storing the decoded output produced by the respective decoders;
    a plurality of multiplexers each having as inputs thereto said first multiplicand X stored in said first register, the odd multiples of said first multiplicand X stored in said further registers, and even multiples of said first multiplicand X derived by shifting the bits thereof; the total number of inputs to each multiplexer being equal to the number of possible $2^{w_i}$ values of the decoded output of each of said decoders;
    biasing means for enabling said multiplexers to operate over all four quadrants of multiplication of said first and second multiplicands by applying a bias to such multiplicands so that only positive values thereof are provided to said multiplexers; and means for shifting the bits of said first multiplicand X to obtain even multiples thereof as further inputs to each of said multiplexers;

each of said multiplexers being connected to the output of a respective one of said decoders and being controlled thereby to select one of the inputs to such multiplexer as an output of such multiplexer, such output being a partial product of said first multiplicand X by the $2^{w_i}$ value of one of said bit slices of said second multiplicand C; and a pipeline adder tree connected to said multiplexers to sum the totality of said partial products produced thereby shifted in accordance with the binary weights thereof, such sum being the product of said first and second multiplicands.

4. A digital multiplier circuit for determining the product of a first multiplicand X having M bits and a second multiplicand C having L bits, comprising:

a first register for receiving in parallel and storing the M bits of said first multiplicand X;

a plurality W of decoders for respectively receiving respective slices of $w_i$ bits of said second multiplicand C, where $1 < w_i < L$ and also $w_i \leq w_j$, $w_j$ being a preselected number;

means connected to said first register for multiplying said first multiplicand X by possible $2^{w_i}$ values of the $w_i$ bit slices of said second multiplicand so as to derive all possible partial products thereof;

multiplexing means connected to said multiplying means and to said decoders for selecting one of said possible partial products of possible $2^{w_i}$ values of respective bit slices of said second multiplicand C times said first multiplicand X; and biasing means for enabling said multiplexing means to operate over all four quadrants of multiplication of said first and second multiplicands by applying a bias to such multiplicands so that only positive values thereof are provided to said multiplexing means; and means connected to said multiplexing means for deriving the sum of the partial products selected thereby for all of said bit slices, shifted in accordance with the binary weights of such bit slices, such sum constituting the product of said first and second multiplicands.

5. A digital multiplier circuit as claimed in claim 4, further comprising a set of second registers, and wherein said multiplying means precalculates and stores in respective ones of said second registers a set of partial products of possible $2^{w_i}$ values of said $w_i$ bit slices of said second multiplicand C times said first multiplicand X, each such set of partial products comprising odd multiples of X by such possible values of such bit slices and a subset of all multiples of X by such possible values.

6. A digital multiplier circuit as claimed in claim 5, wherein said set of partial products is calculated and stored in said set of second registers simultaneously with the storing of said first multiplicand X in said first register.

7. A digital multiplier circuit as claimed in claim 5, wherein:

said multiplexing means for selecting partial products comprises means for shifting said first multiplicand X to obtain even multiples thereof, and means to access the odd multiples of X stored in said set of second registers;

said decoders respectively decode the respective $w_i$ bit slices of said second multiplicand C received thereby to produce at an output thereof the $2^{w_i}$ value of such bit slice;

said multiplier circuit further comprises a plurality of latches for storing the outputs of the respective decoders; and said multiplexing means comprises a plurality of tristate multiplexers respectively connected to said latches to receive therefrom the outputs of said decoders and being gated thereby to select one of said partial products produced by said multiplying means.

8. A digital multiplier circuit as claimed in claim 7, wherein:

each of said tristate multiplexers has a single gating input, regardless of the number of bits $w_i$ in any bit slice, and which is connected to one of said latches to receive the output of one of said decoders;

each of said multiplexers further having inputs for receiving from said multiplying means the products of a multiplication of X by possible $2^{w_i}$ values of the bit slices of said second multiplicand C;

the outputs of the respective decoders gate the respective multiplexers to select one of the inputs thereto as an output of such multiplexer; and said multiplier circuit further comprises a pipeline adder tree coupled to the outputs of said multiplexers.

9. A digital multiplier circuit as claimed in any one of claims 1 to 8, wherein said biasing means can be disconnected from said circuit by a switch provided at an input to said circuit.

* * * * *